(12) United States Patent
Shirazi et al.

(10) Patent No.: US 7,747,423 B1
(45) Date of Patent: Jun. 29, 2010

(54) SYSTEMS AND METHODS OF CO-SIMULATION UTILIZING MULTIPLE PLDS IN A BOUNDARY SCAN CHAIN

(75) Inventors: Nabeel Shirazi, San Jose, CA (US); Jonathan B. Ballagh, Boulder, CO (US); Chi Bun Chan, Longmont, CO (US)

(73) Assignee: Xilinx, Inc., San Jose, CA (US)

( * ) Notice: Subject to any disclaimer, the term of this patent is extended or adjusted under 35 U.S.C. 154(b) by 850 days.

(21) Appl. No.: 11/527,841

(22) Filed: Sep. 27, 2006

(51) Int. Cl.
*G06F 17/50* (2006.01)

(52) U.S. Cl. .......................................... 703/13; 703/14

(58) Field of Classification Search .................. 703/13, 703/14
See application file for complete search history.

(56) References Cited

U.S. PATENT DOCUMENTS

| | | | |
|---|---|---|---|
| 7,112,992 B1* | 9/2006 | Guzman et al. | 326/38 |
| 7,343,572 B1* | 3/2008 | Stone et al. | 716/4 |
| 7,366,651 B1* | 4/2008 | Milne et al. | 703/27 |
| 7,376,544 B1* | 5/2008 | Dick et al. | 703/14 |
| 7,383,478 B1* | 6/2008 | Ballagh et al. | 714/725 |
| 7,480,606 B2* | 1/2009 | Tseng et al. | 703/14 |
| 7,546,572 B1* | 6/2009 | Ballagh et al. | 716/16 |
| 2004/0260528 A1* | 12/2004 | Ballagh et al. | 703/14 |

OTHER PUBLICATIONS

Xilinx, Inc.; XAPP139; "Confi .gt~ration and Readback of Virtex FPGAs Using 0TAG)..~undary Scan"; (v1.6), Sep. 12, 2003; available from Xilinx, Inc., 2100 Logic drive, San Jose, ~.alifornia 95124; pp. 1-17.*

Xilinx, Inc.; Xilinx System Generator for DSP v8.1; User's Guide; "Using FPGA Hardware in the Loop: Compiling a Model for Co-Simulation"; Apr. 25, 2006; pp. 187-189.

Xilinx, Inc.; Xilinx System Generator for DSP v8.1; User's Guide; "Using FPGA Hardware in the Loop: JTAG Hardware Co-Simulation"; Apr. 25, 2006; pp. 196-210.

* cited by examiner

*Primary Examiner*—Paul L Rodriguez
*Assistant Examiner*—Eunhee Kim
(74) *Attorney, Agent, or Firm*—Lois D. Cartier; LeRoy D. Maunu

(57) ABSTRACT

Systems and methods of performing co-simulation of a partitioned circuit design using multiple programmable logic devices (PLDs) coupled together to form a boundary scan chain. A host computer is coupled to the scan chain via a programming cable. Resident on the host computer are run-time co-simulation blocks corresponding to blocks from the circuit design, where each block is designated to run on one of the PLDs in the scan chain; a programming cable device driver interfacing with the programming cable; and a proxy component. The proxy component is coupled to all of the run-time co-simulation blocks and the programming cable device driver. Each co-simulation block includes a unique pattern identifier, which is also present in the associated PLD. Using this pattern identifier, data and commands targeted to a specific PLD can be extracted from the scan chain, while ignoring data and commands targeted to other PLDs in the scan chain.

20 Claims, 4 Drawing Sheets

US 7,747,423 B1

SYSTEMS AND METHODS OF CO-SIMULATION UTILIZING MULTIPLE PLDS IN A BOUNDARY SCAN CHAIN

FIELD OF THE INVENTION

The invention relates to the co-simulation of electronic circuit designs. More particularly, the invention relates to systems and methods of performing co-simulation of a partitioned circuit design using multiple programmable logic devices (PLDs) coupled together to form a boundary scan chain.

BACKGROUND OF THE INVENTION

Hardware co-simulation allows a circuit or system designer to partition an electronic circuit design into multiple pieces, and to simulate or emulate one or more of these pieces on a hardware platform. The other portions of the design are typically simulated using software models running on a host PC workstation. The hardware platform operates under the control of the host workstation, which coordinates communication and data transfers between the software and hardware portions of the design. Hardware co-simulation can be advantageous over fully software-based simulations for numerous reasons, including simulation acceleration, the availability of hardware debug, and real-time verification capabilities.

Programmable logic devices (PLDs) are a well-known type of integrated circuit that can be programmed to perform specified logic functions. One type of PLD, the field, programmable gate array (FPGA), typically includes an array of programmable tiles. These programmable tiles can include, for example, input/output blocks (IOBs), configurable logic blocks (CLBs), dedicated random access memory blocks (BRAM), multipliers, digital signal processing blocks (DSPs), processors, clock managers, delay-locked loops (DLLs), and so forth.

Each programmable tile typically includes both programmable interconnect and programmable logic. The programmable interconnect typically includes a large number of interconnect lines of varying lengths interconnected by programmable interconnect points (PIPs). The programmable logic implements the logic of a circuit design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

PLDs are well suited for hardware co-simulation, due to their reprogrammable nature. It is common for designs to be modified frequently during development. Therefore, in many cases it is useful to be able to co-simulate an up-to-date circuit. By using a PLD as the target platform, a circuit design can be re-complied into a PLD configuration data file once changes are made, and the PLD can be reprogrammed with the new configuration file.

Some PLD companies now provide co-simulations environments that support the use of their PLDs for co-simulation. For example, the "System Generator™ for DSP" software from Xilinx, Inc., is a high-level modeling system that allows electronic designs to be assembled, simulated, and translated into FPGA hardware. System Generator for DSP provides co-simulation interfaces that support numerous FPGA platforms, e.g., the Xilinx ML402 Evaluation Platform and other platforms. In System Generator for DSP, software interfaces and drivers to the PLD hardware are encapsulated by a "run-time hardware co-simulation block". A run-time co-simulation block functions like the other blocks in the circuit design, in that it has ports that produce and consume the same types of signals on which traditional blocks operate.

In the System Generator for DSP software, design hierarchy is supported by subsystems, or systems within other systems. A subsystem is represented as a special block in a "Simulink" diagram. Users can push into a subsystem block, which includes an additional diagram beneath it. Subsystems are used to identify the portion or portions of a design that a user wishes to co-simulate in hardware. When a particular subsystem is compiled for hardware co-simulation, everything within the subsystem is compiled into hardware resources. Once compilation is complete, a new run-time block is created that exposes the same external interface as the subsystem from which it was compiled. Additional information on how designs are compiled for hardware co-simulation can be found in the section entitled "Using FPGA Hardware in the Loop: Compiling a Model for Co-Simulation" (pages 187-189) of the "Xilinx System Generator for DSP v8.1 User's Guide" manual, which pages are hereby incorporated herein by reference. This document is dated Apr. 25, 2006, is available from Xilinx, Inc., and can also be found on the internet as of the filing date of the present patent application at: http://www.xilinx.com/support/sw_manuals/sysgen_ug-.pdf.

One type of hardware co-simulation interface that has proved particularly useful is JTAG-based hardware co-simulation. JTAG hardware co-simulation allows any board with a JTAG header and a Xilinx FPGA to be used in the simulation-loop inside System Generator for DSP. To co-simulate a design, a user connects a programming cable (e.g., Platform Cable USB or Parallel Cable IV) to the JTAG header on the FPGA platform. Simulation commands and data are transmitted between the host workstation and hardware platform over the programming cable. Additional information on JTAG co-simulation can be found in the section entitled "Using FPGA Hardware in the Loop: JTAG Hardware Co-simulation" (pages 196-210) of the "Xilinx System Generator for DSP v8.1 User's Guide" manual, which pages are hereby incorporated herein by reference.

A shortcoming of the present system for co-simulation using JTAG is that the JTAG hardware co-simulation infrastructure does not support concurrent co-simulation using multiple PLDs. It is not uncommon for hardware co-simulation platforms to contain multiple PLD devices; however, JTAG co-simulation is not adequately supported for these platforms. Rather than a cohesive solution allowing concurrent co-simulation, JTAG co-simulation can only be performed using one of the PLDs at any given time.

Therefore, it is desirable to provide systems and methods enabling concurrent JTAG co-simulation of multiple PLDs in a co-simulation hardware platform.

SUMMARY OF THE INVENTION

The invention provides systems and methods of performing co-simulation of a partitioned circuit design using multiple programmable integrated circuits (e.g., programmable logic devices, or PLDs) coupled together to form a boundary scan chain. A host computer is coupled to the boundary scan chain via a boundary scan programming cable. Resident on the host computer are two or more run-time co-simulation blocks corresponding to blocks from the circuit design, where each block is designated to run on one of the PLDs in the boundary scan chain. The host computer also includes a programming cable device driver interfacing with the programming cable, and a proxy component. The proxy component is coupled to all of the run-time co-simulation blocks and to the programming cable device driver.

In some embodiments, each co-simulation block includes a unique pattern identifier, which is also present in the associated PLD. Using this pattern identifier, data and commands targeted to a specific PLD can be extracted from the boundary scan chain, while ignoring data and commands targeted to other PLDs in the scan chain. For example, the pattern identifier for each PLD can include a value indicative of the position of the PLD within the boundary scan chain.

The invention further provides methods of utilizing systems such as those described above to simulate a circuit design using PLDs coupled together to form a boundary scan chain.

BRIEF DESCRIPTION OF THE DRAWINGS

The present invention is illustrated by way of example, and not by way of limitation, in the following figures.

DETAILED DESCRIPTION OF THE DRAWINGS

The present invention is applicable to a variety of programmable integrated circuits. An appreciation of the present invention is presented by way of specific examples utilizing programmable logic devices (PLDs) such as field programmable gate arrays (FPGAs). However, the present invention is not limited by these examples, and can be applied to many different ICs that include programmable resources.

Figure 1:
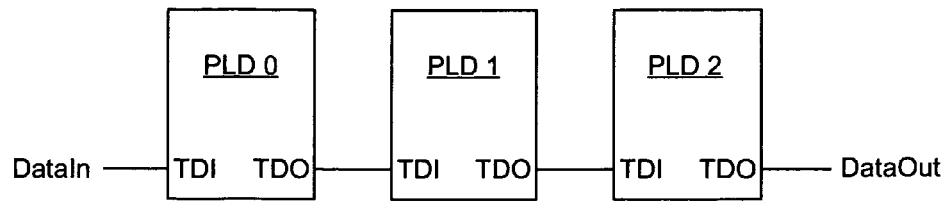
FIG. 1 is a simplified representation of a boundary scan chain.

As noted above, it is not uncommon for hardware co-simulation platforms (e.g., development boards) to contain multiple PLD devices. Moreover, it is possible to daisy chain two or more PLD platforms together using the TDO (Test Data Out) and TDI (Test Data In) pins found on JTAG headers. For multi-PLD platforms that support traditional JTAG-based programming and debugging capabilities, the PLDs are generally accessible for configuration and debug purposes via the boundary scan chain interface in a serial configuration, as shown in FIG. 1. In FIG. 1, three PLDs (PLD0-PLD2) are daisy chained together in a data chain beginning at a DataIn terminal and ending at a DataOut terminal.

Ideally, users could utilize the boundary scan chain for concurrent co-simulation by creating a separate run-time co-simulation block for each device on the scan chain, and co-simulating each co-simulation block concurrently. However, two limitations must be overcome to allow such concurrent co-simulation: data synchronization and resource sharing.

With regard to data synchronization, JTAG data is shifted serially through the boundary scan chain. Therefore, all of the data is visible at some point to all of the devices on the scan chain. Hence, it is necessary to ensure that a particular device on the scan chain receives co-simulation data that is intended for that device, while filtering out any data that is not intended for that device. Therefore, the particular device (or devices) being co-simulated must know when to capture the co-simulation data that is making its way through the scan chain.

One solution to the data synchronization issue involves using a shift register based approach to capture scan chain data. Rather than loading incoming JTAG data from the TDI pin directly into all of the PLDs in the scan chain, the JTAG data is first shifted into a shift register, then is selectively captured in a second register stage at a designated point (e.g., the end) of the shift operation. Capture in the second register stage occurs only when the PLD is identified as the correct target for the incoming data.

Figure 2:
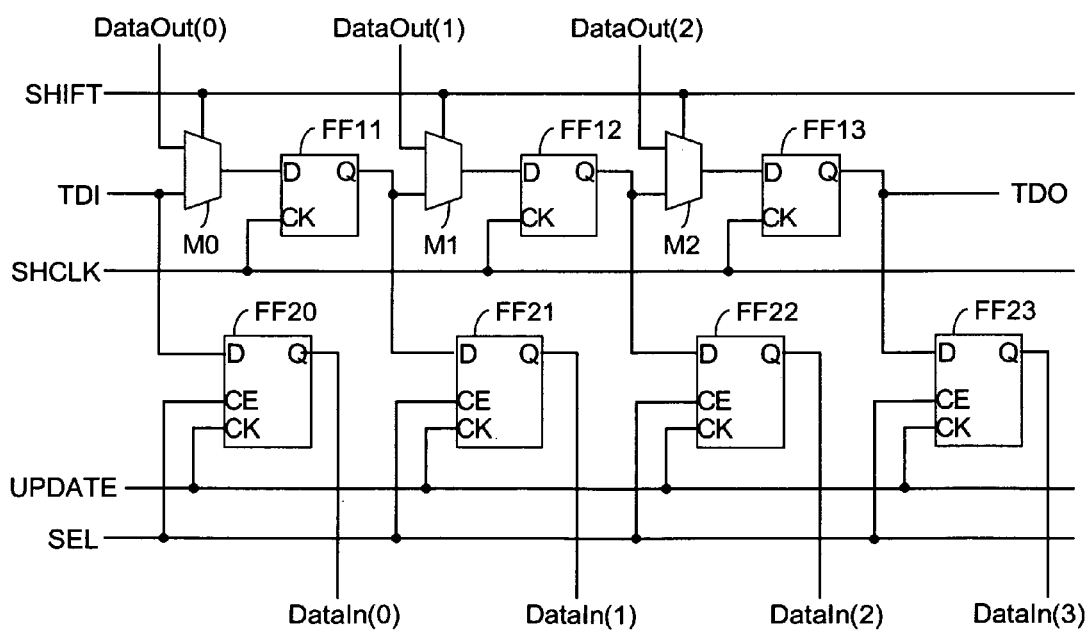
FIG. 2 is a schematic diagram of one method of extracting data from a boundary scan chain, according to some embodiments of the present invention.

FIG. 2 illustrates one way in which such a circuit can be implemented. The circuit of FIG. 2 includes a first set of flip-flops FF11-FF13 implementing a shift register, a second set of flip-flops FF20-FF23 implementing a capture register, and a set of multiplexers M0-M2, all of which are coupled together as shown in FIG. 2. The shift register is a portion of a typical boundary scan chain, and is typically hard-coded into a PLD. The capture register can be implemented, if desired, using the programmable logic of the PLD. The circuit of FIG. 2 functions as follows.

When data is being read from the scan chain, all PLDs provide data to the scan chain. The output data DataOut(0)-DataOut(2) from the various scan points in the PLD is selected by multiplexers M0-M2 under control of the mode control signal SHIFT, and is loaded into the shift register FF11-FF13 when the shift clock signal SHCLK goes high. The circuit then goes into a second mode, i.e., signal SHIFT changes value, and shift register FF11-FF13 shifts the data from the PLD out the TDO pin for the PLD.

When data is being written to the PLD, data from the TDI pin is shifted through shift register FF11-FF13 until the data is completely loaded. Then, if the PLD is identified as the target for the incoming data (e.g., signal SEL is high), the data is captured in capture register FF20-FF23 when the UPDATE signal goes high, and is provided to the appropriate internal points of the PLD via the input data terminals DataIn(0)-DataIn(3).

It will be understood that there are typically many more JTAG data points in a PLD than the three shown in FIG. 2. However, only three bits of the scan chain are shown in FIG. 2, for clarity.

The solution illustrated in FIG. 2 requires that the amount of data being transferred to the PLD at any given time be less than or equal to the size of the shift register. It is also necessary for the software application to correctly align the data bits in the shift register to the scan chain during a shift operation. The data being shifted may be too large to fit in the shift register, for example, when the data includes frames of audio or video data. In this case, the data is segmented and shifted to the PLD using a series of transactions.

With regard to resource sharing, JTAG hardware co-simulation relies on a software device driver to handle communication over the programming cable. Therefore, if a straightforward implementation were used, each run-time co-simulation block would load a copy of the driver before simulation began. Once loaded, the co-simulation block would open and lock the cable before any data was transmitted. Therefore, cable sharing issues would occur as multiple co-simulation blocks attempted to open and access the same programming cable resource. Clearly, when the first co-simulation block locked the cable, the remaining co-simulation blocks would be denied access to the cable. Therefore, a single software resource is needed that provides access to the cable for all of the co-simulation blocks.

Figure 3:
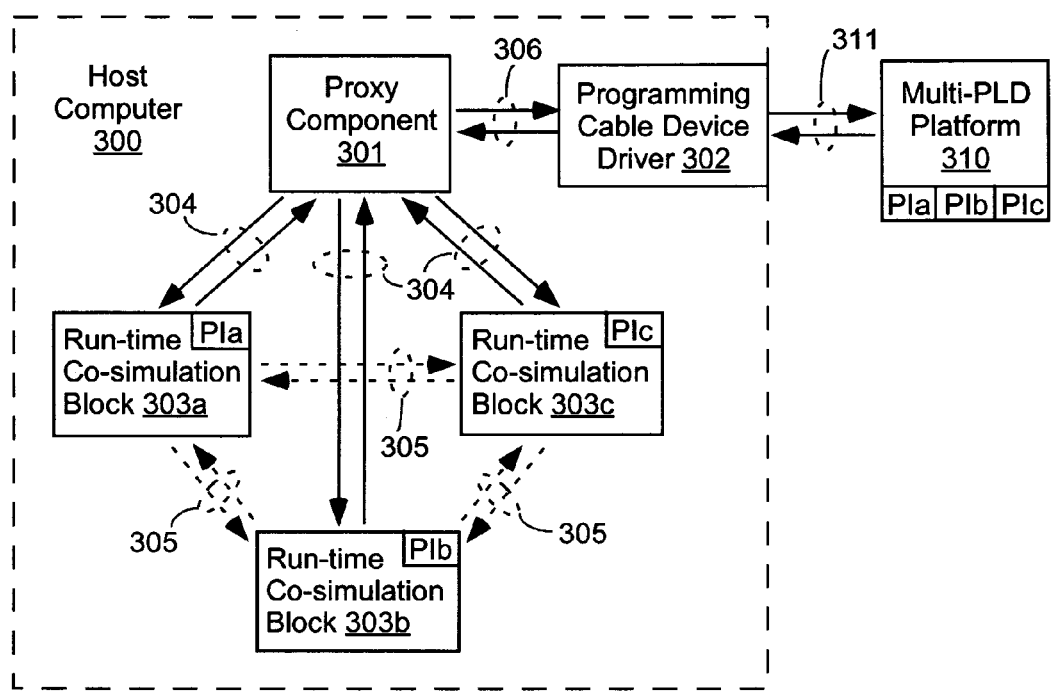
FIG. 3 illustrates a first system for co-simulating PLDs coupled together in a boundary scan chain, according to one embodiment of the present invention.

FIG. 3 illustrates a system that addresses both the issues of data synchronization and resource sharing. To solve the data-synchronization issue, a unique pattern identifier is provided for each PLD in the boundary scan chain that identifies the target PLD for each packet of data sent via the boundary scan chain. To solve the resource sharing issue, a co-simulation proxy object is provided that can service driver-level requests from multiple run-time co-simulation blocks. In one embodiment, the proxy is a software component that accepts commands and data from one or more hardware co-simulation blocks, e.g., via a memory accessible to all of the co-simulation blocks. In some embodiments, each co-simulation block includes a copy of the unique pattern identifier for the associated PLD (e.g., the PLD that will be used to simulate the portion of the circuit design associated with the software co-simulation block). Thus, the unique pattern identifier can be incorporated into the data that the co-simulation block sends through the boundary scan chain, and can be used to correctly identify the target PLD for the data packet.

The system of FIG. 3 includes a host computer (e.g., a workstation) 300, a multi-PLD platform (e.g., a PLD development board including multiple PLDs) 310, and a programming cable 311. PLD platform 310 includes two or more PLDs (three, in the pictured embodiment), which are coupled together to form a boundary scan chain internal to the PLD platform. The host computer 300 is coupled to a chain input terminal (e.g., a TDI terminal) of the first PLD in the scan chain and to a chain output terminal (e.g., a TDO terminal) of the last PLD in the scan chain, via the programming cable 311. Programming cable 311 includes signal lines for boundary scan data and commands, e.g., JTAG signals TDI, TDO, TCK, and TMS.

Host computer 300 includes a proxy component (e.g., a software object) 301 and a programming cable device driver 302, which interfaces between proxy component 301 and the programming cable 311. Host computer 300 also includes two or more run-time co-simulation blocks 303a-303c, one for each of the PLDs in multi-PLD platform 310. Each co-simulation block includes a unique pattern identifier Pla-Plc, corresponding to a pattern identifier present in a corresponding one of the PLDs in the boundary scan chain. The use of these pattern identifiers is described in more detail below.

Each of the co-simulation blocks 303a-303c interfaces to the proxy component 301 (arrows 304), and there may also be interaction between the various co-simulation blocks (arrows 305) reflecting the interconnections among the associated blocks of the circuit design. The interface 306 between proxy component 301 and programming cable device driver 302, and the interfaces 304 between proxy component 301 and run-time co-simulation blocks 303a-303c, include co-simulation commands and data to be used by, or received from, the various co-simulation blocks implemented in hardware (platform 310). The communication between the various software objects resident on the host computer can be accomplished, for example, by exchanging data via a commonly-accessible memory (not shown).

FIG. 3 illustrates a system for simulating a circuit design in which three design blocks are designated for co-simulation. However, this number of co-simulation blocks is purely exemplary, and the number of co-simulation blocks can be two, four, five, or a larger number, as desired.

The system of FIG. 3 functions as follows.

1) Before the start of simulation, each run-time co-simulation block 303a-303c checks to see if a co-simulation proxy component 301 already exists, and, if the proxy does exist, obtains a handle to the proxy. If a proxy does not yet exist, the run-time block 303a-303c creates a new proxy component 301 and adds it to global object management (i.e., memory that is visible to all software objects involved in the simulation, not shown), and then obtains the handle to the proxy.

2) At the start of simulation, proxy component 301 opens the programming cable 311 via programming cable device driver 302.

3) During simulation, an individual run-time co-simulation block 303a-303c calls general purpose functions (e.g., data read/write, clock stepping, device configuration, etc.) via the proxy handle obtained in step 1, to ensure communication over the programming cable 311 is managed by a single resource. In one embodiment, proxy component 301 immediately initiates a transaction with PLD platform 310 whenever a command is invoked. In another embodiment, proxy component 301 buffers commands and data to reduce the number of transactions with the PLD platform, e.g., buffering input values for all run-time co-simulation blocks and writing the data to the PLD platform in a single transaction. Therefore, proxy component 301 must be able to handle the interleaving of data and commands associated with multiple run-time co-simulation blocks.

4) At the end of simulation, proxy component 301 closes and releases programming cable 311 via the programming cable device driver 302.

Figure 4:
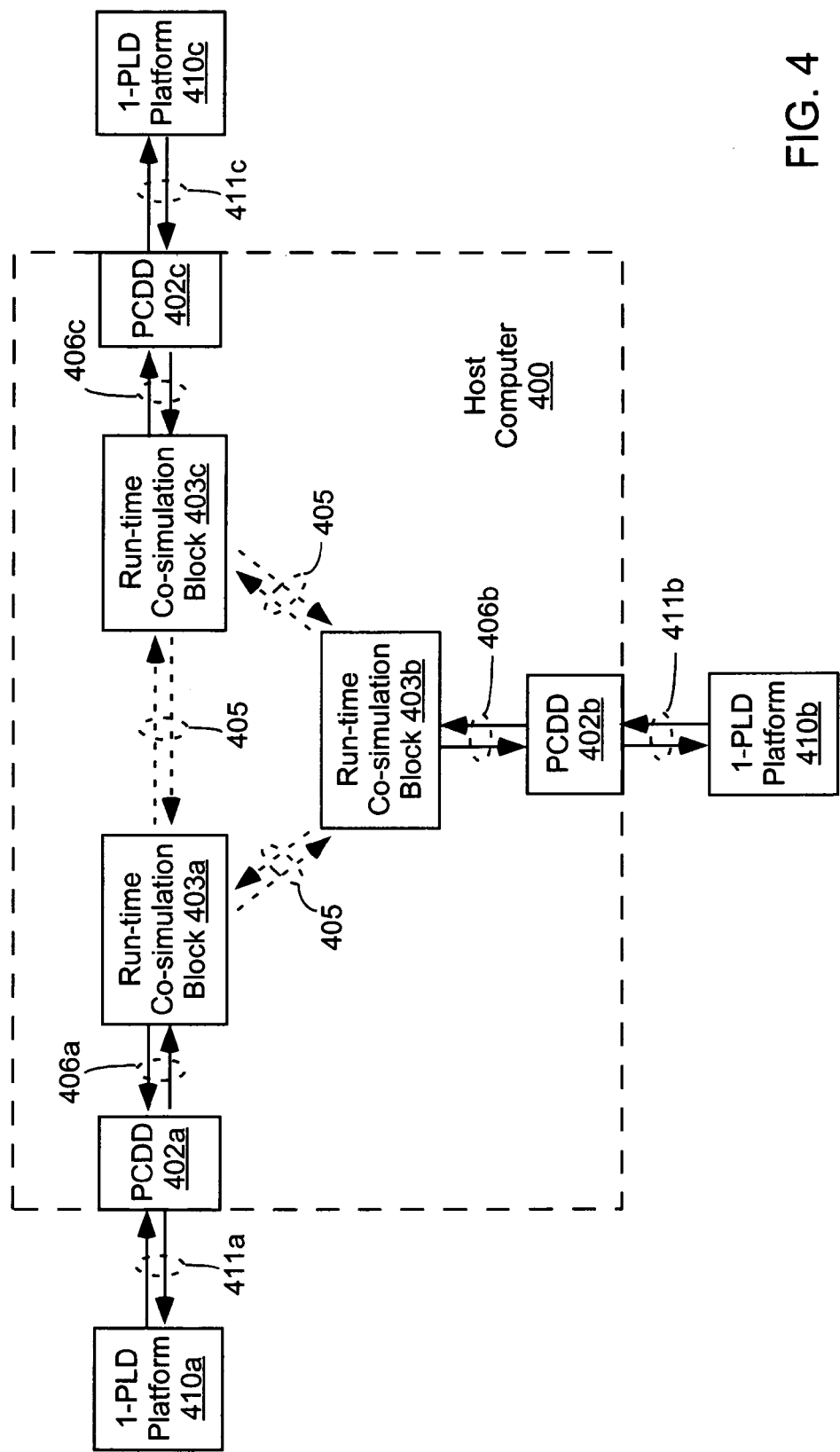
FIG. 4 illustrates a known system for co-simulation utilizing multiple PLDs.

By way of contrast, FIG. 4 illustrates a system in which multiple PLDs are used for co-simulation using known methods. The three exemplary PLDs each reside in their own PLD platform 410a-410c. Three different programming cables 411a-411c are needed, with each programming cable being coupled to a different programming cable device driver (PCDD) 402a-402c on the host computer 400. Each programming cable device driver 402a-402c is coupled to an associated run-time co-simulation block 403a-403c (arrows 406a-406c), and the various run-time co-simulation blocks 403a-403c may interact with each other as designated by arrows 405. No proxy is needed or used, because each programming cable is controlled by a different device driver. Note that this system does not accommodate multi-PLD platforms.

The embodiment of FIG. 3 illustrates a system in which a single PLD platform includes multiple PLDs coupled together in a boundary scan chain. However, multiple PLD platforms can be used, each including one or more PLDs, as shown in FIG. 5.

Figure 5:
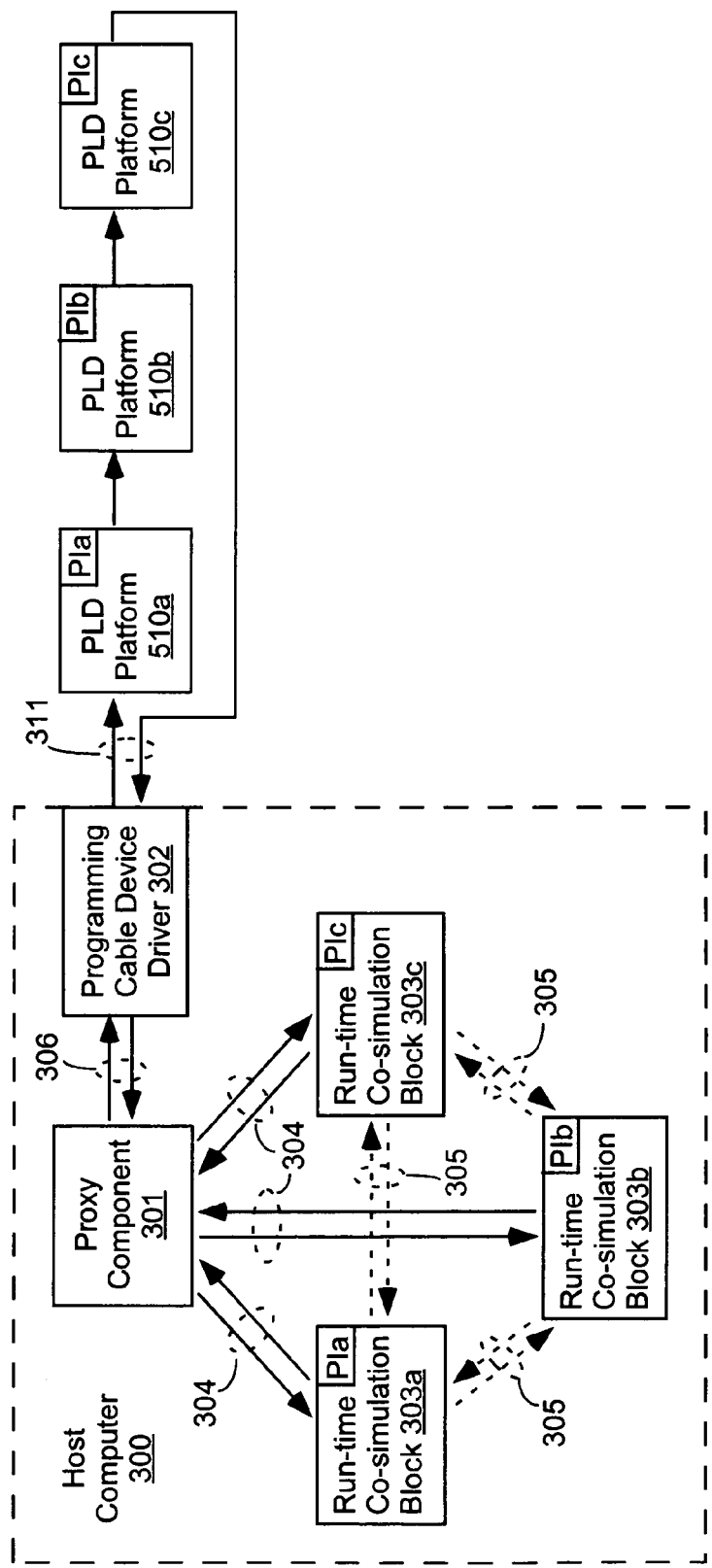
FIG. 5 illustrates a second system for co-simulating PLDs coupled together in a boundary scan chain, according to another embodiment of the present invention.

FIG. 5 illustrates a system that includes host computer 300 of FIG. 3, coupled via programming cable 311 to a boundary scan chain including three PLD platforms 510a-510c. In the pictured embodiment, each of the three PLD platforms 510a-510c includes a single PLD, and the three PLDs in the three platforms are coupled together in series to form the boundary scan chain. Programming cable 311 is coupled to the TDI pin of the first PLD in the chain, and to the TDO pin of the last PLD in the chain.

Other embodiments (not shown) include multiple PLD platforms including different numbers of PLDs, or more than one PLD in one or more of the platforms, and so forth.

To address the data synchronization issue, a unique and static pattern identifier (e.g., Pla-Plc in FIGS. 3 and 5) can be stored in each of the PLDs on the boundary scan chain. Each PLD has a different static pattern identifier, which can be stored in the PLD in various ways. For example, the pattern identifier can be a unique identifier stored in E-fuses by the manufacturer, e.g., the manufacturer could assign a unique identifier identifying the die by lot number, wafer, and position of the die on the wafer. In some embodiments, the pattern identifier is stored in non-volatile memory such as an on-chip EPROM or EEPROM, e.g., by the manufacturer or the user. It will be clear to those of skill in the art that many other methods can be used for storing a unique pattern identifier in a PLD, including storing a unique pattern identifier in volatile memory as part of the configuration process for the PLD.

Each PLD waits until the unique pattern identifier is detected in the data arriving through the boundary scan chain, before capturing data from the scan chain. For example, a particular PLD may wait for the pattern "A5A5" to be detected on the incoming data before starting to capture data. In some embodiments, the pattern is followed in the boundary scan data by a length field that specifies the size of the subsequent data transfer. When the pattern identifier included in the bitstream does not match the unique pattern identifier of the PLD, the data is simply passed to the next PLD in the boundary scan chain, and is not captured by the present PLD. For example, the circuit shown in FIG. 2 can be used to capture data or to allow the data to bypass a specific PLD.

In other embodiments, a dynamic synchronization pattern is used as the pattern identifier (e.g., Pla-Plc in FIGS. 3 and 5). For example, the PLD boundary scan positions may be different in different systems, either because jumper settings on the platform may differ, or because multiple platforms may be daisy chained together. However, clearly each PLD occupies a unique position in the boundary scan chain of a given system. Therefore, a unique pattern identifier can be generated for each PLD using the position of the PLD in the boundary scan chain of the system.

In some embodiments, the pattern identifier is stored in two places, in the run-time co-simulation block (e.g., 303a-303c of FIGS. 3 and 5) and within a block memory embedded inside the PLD. Each pattern includes a fixed set of bits plus a representation of the device's position in the scan chain (e.g., "A5A54", where "A5A5" is the fixed bit pattern and "4" is the position of the PLD in the boundary scan chain. Using this approach ensures that each run-time block is assigned a unique pattern with reference to all of the other run-time blocks in the system. To help avoid having this pattern show up in the boundary scan data, potentially triggering a false positive identification, the fixed pattern bits can be generated, if desired, by computing a 32-bit or larger hash value as a function of attributes on the run-time block. For example, these attributes can include scan chain position, port names, bitstream size, and so forth.

In some embodiments, the derivation of unique identifiers is left to the co-simulation engine on the host, which has the master control over all run-time blocks. The fixed set of bits is selected to avoid duplication of other control and user (co-simulation) data sent across the boundary scan chain. The varying set of bits is selected such that each PLD has a different pattern, and can therefore be easily assigned by the host, which has access to all of the necessary information, e.g., including the mapping between run-time blocks (designs) and PLDs. For example, the host can use the digest of run-time block attributes to derive the varying set of bits.

Before a simulation begins, dynamic synchronization patterns are generated for each run-time block, and are included in the configuration bitstream for each PLD. For example, when the PLDs are Xilinx PLDs, the software utility "data2mem" can be used to update the portion of the co-simulation bitstream that stores the pattern value. In one embodiment, a user manually enters the boundary scan positions in the run-time co-simulation blocks. In another embodiment, the position is determined automatically by matching a device ID obtained using a readback process against part information previously stored in the run-time co-simulation block. Note that this embodiment requires that the device IDs be different for each of the PLDs in the boundary scan chain.

In some embodiments, the result of the comparison between the pattern identifier from the boundary scan input data and the pattern identifier stored in the PLD is used to generate the SEL control signal in the circuit of FIG. 2. Signal SEL either allows the input data to be passed into the PLD (when the two pattern identifiers are the same) or causes the input data to be ignored except for being passed on to the boundary scan output terminal TDO (when the two pattern identifiers are not the same).

In some embodiments, when the proxy component (e.g., 301 of FIG. 3) reads or writes to a specific PLD, the proxy component ensures that the appropriate pattern is correctly embedded inside the command/data packet targeted to that PLD.

Those having skill in the relevant arts of the invention will now perceive various modifications and additions that can be made as a result of the disclosure herein. For example, the above text describes the circuits and methods of the invention in the context of programmable logic devices (PLDs) such as field programmable gate arrays (FPGAs). However, the circuits of the invention can also be implemented in other programmable integrated circuits (ICs), including, for example, devices that are only partially programmable. For example, one type of programmable IC includes a combination of hard-coded transistor logic and a programmable switch fabric that programmably interconnects the hard-coded transistor logic.

Accordingly, the scope of the invention is to be limited only by the appended claims and their equivalents.

What is claimed is:

1. A system, comprising:
a plurality of programmable integrated circuits (ICs) coupled together to form a boundary scan chain;
a boundary scan programming cable coupled to a chain input terminal of a first one of the programmable ICs in the boundary scan chain and to a chain output terminal in a last one of the programmable ICs in the boundary scan chain; and
a host computer comprising a proxy component, a plurality of run-time co-simulation blocks communicatively coupled to the proxy component, and a programming cable device driver communicatively coupled to the proxy component and interfacing with the boundary scan programming cable, wherein each of the run-time co-simulation blocks is associated with a corresponding one of the programmable ICs;
wherein each of the plurality of programmable ICs is configured to emulate a respective portion of an electronic circuit design; and
wherein for each of the run-time co-simulation blocks, data written to an input port of the run-time co-simulation block is provided via the proxy component as input to the respective portion of the electronic circuit design emulated on the associated one of the programmable ICs, and for data at an output port of the run-time co-simulation block, the run-time co-simulation block retrieves the data via the proxy component from the respective portion of the electronic circuit design emulated on the associated one of the programmable ICs.

2. The system of claim 1, wherein the plurality of programmable ICs reside on a single co-simulation platform.

3. The system of claim 1, wherein the plurality of programmable ICs reside on a plurality of co-simulation platforms.

4. The system of claim 3, wherein each of the plurality of programmable ICs resides on a different one of the plurality of co-simulation platforms.

5. The system of claim 1, wherein each of the programmable IC comprises:
- a boundary scan data input terminal;
- a boundary scan data output terminal;
- means for passing input data received at the boundary scan data input terminal to the boundary scan data output terminal; and
- means for loading the input data into the programmable IC when a specific pattern identifier is detected in the input data and ignoring the input data when the specific pattern identifier is not detected,
- wherein the specific pattern identifier is different for each of the programmable ICs.

6. The system of claim 5, wherein each of the run-time co-simulation blocks comprises the specific pattern identifier for the associated programmable IC.

7. The system of claim 5, wherein the specific pattern identifier for each programmable IC comprises a static pattern identifier based on a value stored in the programmable IC.

8. The system of claim 5, wherein the specific pattern identifier for each programmable IC comprises a value indicative of a position of the programmable IC within the boundary scan chain.

9. The system of claim 1, wherein the programmable ICs comprise programmable logic devices (PLDs).

10. A system, comprising:
- a plurality of programmable integrated circuits (ICs) coupled together to form a boundary scan chain, each of the programmable ICs having a unique position within the boundary scan chain;
- a boundary scan programming cable coupled to a chain input terminal of a first one of the programmable ICs in the boundary scan chain and to a chain output terminal in a last one of the programmable ICs in the boundary scan chain; and
- a host computer comprising a proxy component, a plurality of run-time co-simulation blocks communicatively coupled to the proxy component, and a programming cable device driver communicatively coupled to the proxy component and interfacing with the boundary scan programming cable, wherein each of the run-time co-simulation blocks comprises a pattern identifier comprising the unique position of a corresponding one of the programmable ICs;
- wherein each of the plurality of programmable ICs is configured to emulate a respective portion of an electronic circuit design; and
- wherein for each of the run-time co-simulation blocks, data written to an input port of the run-time co-simulation block is provided via the proxy component as input to the respective portion of the electronic circuit design emulated on the associated one of the programmable ICs, and for data at an output port of the run-time co-simulation block, the run-time co-simulation block retrieves the data via the proxy component from the respective portion of the electronic circuit design emulated on the associated one of the programmable ICs.

11. The system of claim 10, wherein the plurality of programmable ICs reside on a single co-simulation platform.

12. The system of claim 10, wherein the plurality of programmable ICs reside on a plurality of co-simulation platforms.

13. The system of claim 12, wherein each of the plurality of programmable ICs resides on a different one of the plurality of co-simulation platforms.

14. The system of claim 10, wherein each of the programmable ICs comprises:
- a boundary scan data input terminal;
- a boundary scan data output terminal;
- means for passing input data received at the boundary scan data input terminal to the boundary scan data output terminal; and
- means for loading the input data into the programmable ICs when the pattern identifier for the programmable IC is detected in the input data and ignoring the input data when the pattern identifier for the programmable ICs is not detected.

15. The system of claim 10, wherein the programmable ICs comprising programmable logic devices (PLDs).

16. A method of simulating a partitioned circuit design utilizing a plurality of programmable integrated circuits (ICs) coupled together in a boundary scan chain, the method comprising:
- implementing in a host computer a plurality of run-time co-simulation blocks, each of the run-time co-simulation blocks representing a different subset of the circuit design, each of the run-time co-simulation blocks being associated with a corresponding one of the programmable ICs;
- implementing in the host computer a programming cable device driver, the programming cable device driver being in bi-directional communication with the boundary scan chain;
- implementing in the host computer a proxy component, wherein the proxy component is communicatively coupled to each of the plurality of run-time co-simulation blocks and to the programming cable device driver;
- programming each of the programmable ICs with a corresponding subset of the circuit design via the proxy component and the programming cable device driver as directed by the associated run-time co-simulation block; and
- simulating the circuit design under control of the host computer utilizing the subsets of the circuit design programmed into each of the programmable ICs;
- wherein each of the plurality of programmable ICs is configured to simulate the corresponding subset of the electronic circuit design; and
- wherein for each of the run-time co-simulation blocks, data written to an input port of the run-time co-simulation block is provided via the proxy component as input to the respective portion of the electronic circuit design emulated on the associated one of the programmable ICs, and for data at an output port of the run-time co-simulation block, the run-time co-simulation block retrieves the data via the proxy component data from the respective portion of the electronic circuit design emulated on the associated one of the programmable ICs.

17. The method of claim 16, wherein each of the run-time co-simulation blocks comprises a unique pattern identifier, the method further comprising:

storing, under control of the associated run-time co-simulation block, one of the unique pattern identifiers in each of the programmable ICs.

18. The method of claim 17, further comprising:

deriving a unique pattern identifier for each of the programmable ICs based on information read from the programmable ICs; and storing the unique pattern identifier for each programmable ICs in the associated run-time co-simulation block.

19. The method of claim 17, further comprising:

deriving a unique pattern identifier for each of the programmable ICs based on a location of the programmable ICs in the boundary scan chain; and storing the unique pattern identifier for each programmable ICs in the associated run-time co-simulation block.

20. The method of claim 16, in which the steps are performed in the order shown in claim 16.

\* \* \* \* \*